March 8, 1966 W. J. BURGON 3,239,329
PROCESSES FOR THE PRODUCTION OF PHOSPHATE PRODUCTS
Filed July 29, 1963
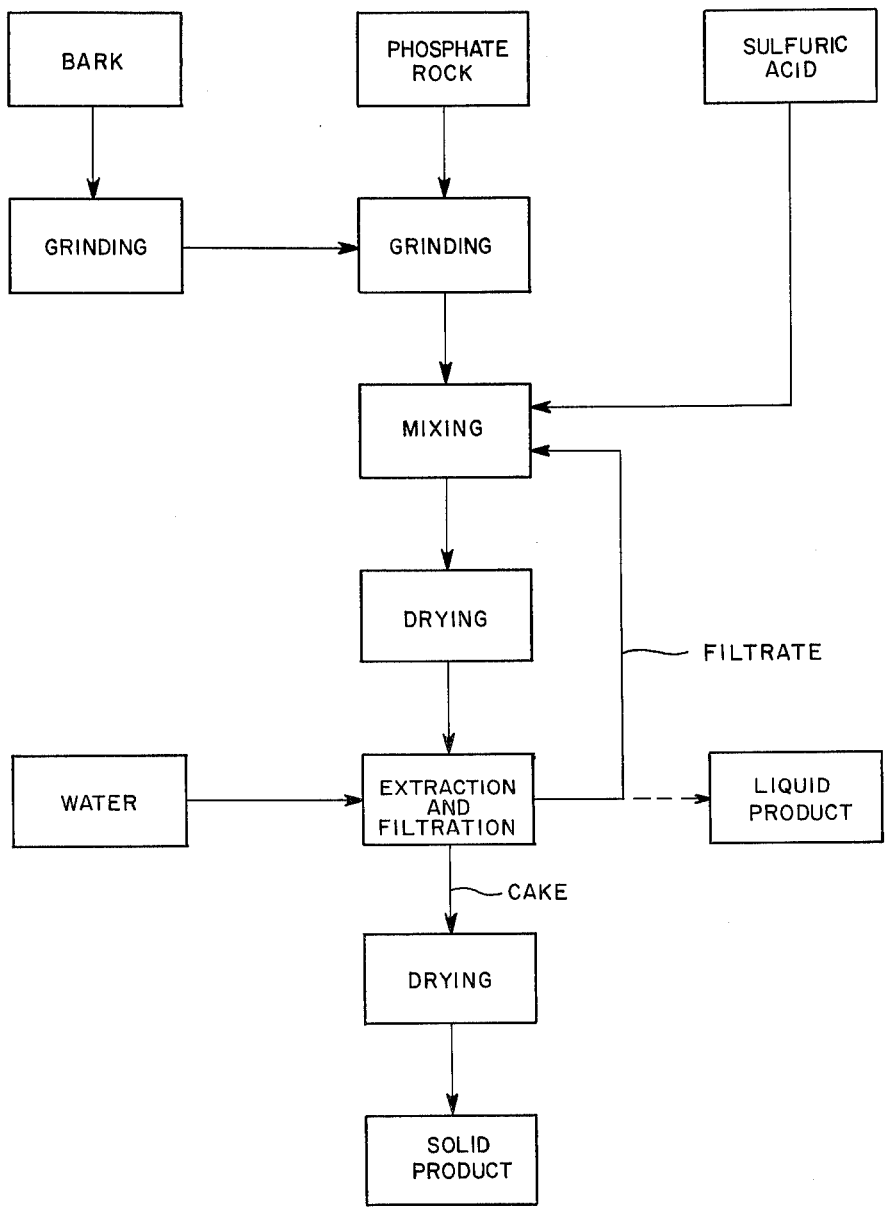
WILLIAM J. BURGON
INVENTOR.
BY Seed & Berry
ATTORNEYS United States Patent Office 3,239,329
Patented Mar. 8, 1966

3,239,329
PROCESSES FOR THE PRODUCTION OF
PHOSPHATE PRODUCTS
William J. Burgon, New Westminster, British Columbia, Canada, assignor to Canadian Forest Products Limited, New Westminster, British Columbia, Canada, a corporation of Canada
Filed July 29, 1963, Ser. No. 298,124
3 Claims. (Cl. 71—23)

This application is a continuation-in-part of my copending applications Serial No. 803,130, filed March 13, 1959, now abandoned, and Serial No. 22,416, filed April 15, 1960, now abandoned.

This invention relates to the production of phosphorus-containing products and has particular reference to improved processes for the utilization of tree bark in the production of water soluble phosphates from phosphate rock.

In my copending patent application Serial No. 298,395, filed July 29, 1963, I have shown that when calcium phosphate rock is distributed on the surface of fine bark particles by grinding the phosphate rock and the moist bark particles together, and when mineral acid is added to this mixture, the organic acids in the bark particles are condensed during the reaction of the mineral acid with the calcium phosphate rock; that such organic acids are condensed to a degree that they have very limited solubility in water or weak mineral acids; and that this reaction develops ion exchange properties in the bark particulate material which assists in binding the mineral acid calcium so as to maintain the separation of this mineral acid calcium from the water soluble $P_2O_5$ which is produced from the calcium phosphate rock. This greatly facilitates the water extraction of $P_2O_5$ from the bark phosphate product, as compared to conventional phosphates, and the product has other novel characteristics fully disclosed in said copending application Serial No. 298,395.

A primary object of the present invention is to provide a process incorporating novel and independently patentable improvements in the process claimed in said copending application Serial No. 298,395.

Another object of this invention is to provide novel processes for the production of bark-phosphate products of controlled $P_2O_5$ content, while utilizing substantially all of the $P_2O_5$ present in the phosphate rock starting material.

A further object of the present invention is to provide an improved process for the production of bark-phosphate products, wherein the quantity of mineral acid required from outside the system is appreciably reduced.

Another object of this invention is to provide a bark phosphate product having a reduced level of $P_2O_5$, but also containing a reduced amount of mineral acid calcium other than calcium phosphate.

Still another object of the present invention is to provide a novel process for the concentration of phosphoric acid solutions.

A further object of the present invention is to provide a novel process for the simultaneous production of bark-phosphate products and the concentration of phosphoric acid solutions.

Other objects and advantages of the present invention it is believed will be readily apparent from the following detailed description of preferred embodiments thereof when read in connection with the drawing.

In the drawing:

The single figure is a flow sheet illustrating a preferred embodiment of the process of the present invention.

The process of the present invention includes the process steps fully disclosed in said copending application Serial No. 298,395, but includes further steps involving extracting or leaching the bark-phosphate products thereof. Thus, in carrying out the process of the present invention, moist raw bark is preferably first ground into relatively fine particles and then mixed with phosphate rock, the amount of bark (dry weight) being from 20% to about 800%, based upon the dry weight of the rock. The moisture content of the bark should be at least 30% by weight and it may be as high as about 70%, but any appreciable amounts of free water on the bark particles should be avoided. The bark-rock admixture is thoroughly ground and blended in any suitable apparatus, such as a hammer mill, so as to produce an intimate mixture of the two materials wherein the bark particles are distributed throughout the mixture in a manner to physically separate the bulk of the rock particles one from the other. Optimum results are obtained by using a sufficient amount of moist bark so that the relatively finer rock particles are adhere to and form a coating upon the discrete bark particles.

I have found that sawdust can be used in place of bark in this process to accomplish the rapid development of water soluble $P_2O_5$ from phosphate rock; and that this $P_2O_5$ can be readily extracted from the sawdust phosphate product by water on filtering equipment to provide a filtrate to substitute for part of the sulphuric acid required on new mixtures of sawdust and rock in the initial stages of the process so that the end product will have available phosphate equal to the limit of the $P_2O_5$ in the rock used in the initial combination with the sawdust and a reduced level of calcium sulfate. The filter cake obtained can be dried in a tumbler type drier to form granules of sawdust phosphate product which is very useful in the soil for soil conditioning and for supplying nutrition to growing plants; but it does not provide the same degree of disease abatement or ion exchange in the soil as the product obtained when bark is used in the initial stages of the process. The distinction arises from the differences in the organic acids in sawdust as compared to bark.

Raw bark which has been extracted with sodium hydroxide or potassium hydroxide or with water or ammonia hydroxide as disclosed in said copending application Serial No. 803,130 (the disclosure of which is herein incorporated by reference), or with alcohol and other solvents such as benzene or hexene, to remove up to 20% of the active acid content of the bark, can be used in the process of the present invention in place of the raw bark to produce the desired end properties in the bark phosphate product, provided that part of the extract acids solids which are water soluble, and equal in amount to at least about 1.5% of the dry weight of the bark, are returned to the extracted bark at or prior to the time the phosphate rock is added. Another substitute for raw bark in the present process comprises a material made by the addition of such water soluble extract acid solids to sawdust, peat or lignite coal in amounts equal to at least about 10% of the dry weight of the sawdust or peat or lignite coal.

Following the grinding of the bark-rock admixture it is then acidulated by the addition of the mineral acid or mixtures thereof, and such mixtures include crude materials such as calcium sulfate slurries containing free sulfuric acid and/or phosphoric acid. As indicated in said copending application Serial No. 298,395, hydrochloric acid or chlorine gas are not suitable reactants in producing products to be used for plant growth, as the calcium chloride is detrimental, but they can be used in producing products useful as intermediates for further processing, or for industrial use.

The amount of acid can be varied from about 20% to about 80% based upon the dry weight of the rock. Approximately 60% of concentrated sulfuric acid (66° Bé.) or 80% of phosphoric acid is required to develop full solubility of the $P_2O_5$ in the rock. The acid is diluted with water to provide the necessary volume for adequate distribution of the acid throughout the mixture and for this purpose the dilution water should be equal to at least the bark weight.

Following and preferably during addition of the acid the mass is thoroughly agitated and mixed. The wet mass is then dried, preferably with continued agitation, as in a tumbler drier, so as to concentrate the mineral acid to the degree necessary for optimum reaction, the drying step further affording the necessary time for the reaction to take place. The drying conditions of time and temperature are not critical and may be varied within rather wide limits. Preferably, the drying time is from 3 to 30 minutes, and the temperatures of the drying air or gas may vary from 100° F. to about 1250° F., shorter drying times being utilized with the higher temperatures and greater volumes of air or gas and vice versa.

The bark phosphate products thus produced are the final products disclosed in said copending application Serial No. 298,395, but constitute intermediate products in the present process, which includes the further step of extracting or leaching these bark phosphate materials, said extraction being carried out with fresh water or, in a modified form of the invention, being carried out with aqueous solutions containing phosphoric acid. The extraction operation can be readily controlled, in respect to the amount of water or aqueous solution utilized and in respect to the extraction time, so as to produce the desired $P_2O_5$ levels in both the extracted solids residue and the extract liquor or filtrate, the physical characteristics of the bark phosphate product disclosed in said copending application Serial No. 298,395 being admirably suited for carrying out the extraction operation directly upon a filter surface.

In a preferred embodiment of the present invention, as shown in the flow sheet, the acid filtrate, or at least a portion thereof, is recirculated to the acidulation step to supplement the sulfuric acid and to thus reduce the requirement for acid from outside the system. It should be noted here that while mineral acids in general can be used in the present process, including hydrochloric acid, nitric acid and even chlorine gas, such mineral acids, other than phosphoric acid, which form soluble calcium salts, are not suitable for use in the embodiment of the process involving recycle of the acid, and in such recycle acid process it is necessary to utilize an initial acid which forms insoluble calcium salts, e.g. sufuric acid.

The following specific examples are illustrative of the process of the present invention, but it is to be understood that the invention is not to be limited to the specific details thereof:

*Example 1*

A sample of Douglas fir bark was ground in a hammer mill so that 80% passed through a 20 mesh screen. The sample had a moisture content of 42% and a quantity was selected to yield 8.84 pounds dry weight. 19.84 pounds of phosphate rock (30% $P_2O_5$), ground so that 95% passed through 100 mesh, was mixed with the ground moist bark by passing the rock and bark again through a hammer mill. 11.68 pounds of sulfuric acid at 66% Bé. to provide a proportion of 59% of the rock as sulfuric was diluted with 10 pounds of water and mixed with the bark and rock mass. The mass began to heat and it was then ground in the hammer mill and dried at a temperature of 300° F. in a tumbler drier to constant weight and samples of the bark phosphate product were taken for testing. The total drying time was 23 minutes. Constant tumbling of the material during drying had produced small balls or granules composed of fine bark particles coated with a calcium sulfate and phosphate crust, from which the $P_2O_5$ was readily extracted with water. A sample of the product was analyzed by standard procedure to show the following analysis: total $P_2O_5$ 14.6%; water soluble $P_2O_5$ 14.1%.

A series of samples of the bark phosphate product was extracted in a two-stage counter-current system on a vacuum filter, using the filtrate from the second stage extraction to extract the unextracted material in the first stage so that fresh water was applied only to the second stage material as wash water. The amount of wash water used was 1.4 parts to 1 part of dry solids on a weight basis.

The filtrate applied to the unextracted material in the first stage was diluted with water so that its weight was equal to the weight of the dry bark phosphate material. The dewatering time of a ½" cake (constituting the extracted solids residue) formed on the filter was 5 seconds at 15" Hg vacuum. The cake had a moisture content of 52%. Based on the area of the filter used, this is equivalent to a filtration rate of 49 pounds of dry solids per hour per sq. ft. of filter area. The weight percent of $P_2O_5$ in the filtrate from this stage was 22.2% and the weight percent $P_2O_5$ in the dried cake after the washing with 1.4 parts water was 1.0%.

Other samples were extracted with varying quantities of water in a single stage extraction system to leave varying levels of $P_2O_5$ in the filter cake which was dried in a tumbler dried to produce hard granules. Under soil test, the $P_2O_5$ in these granules was readily available to plants.

*Example 2*

Another sample of bark phosphate was prepared using the procedure described in the previous example but the material composition was altered as follows to reduce the sulfuric acid and to use the filtrate from the above extraction test in place of water, thus simulating the process shown in the flow sheet:

| | Percent of total composition |
|---|---|
| Bark dry weight | 32 |
| Rock dry weight | 44 |
| Sulfuric acid (66° Bé.) | 14 |
| $P_2O_5$ in added filtrate solution | 10 |

In this composition the bark was 73% of the weight of the rock used; the sulfuric acid was 32% of the weight of the rock used, and $P_2O_5$ in the filtrate added to the sulfuric acid was 23% of the weight of the rock used. This filtrate was diluted with twice its weights in water prior to addition of the sulfuric acid.

This sample was dried for 30 minutes in a tumbler drier to produce small granules. Analysis showed the following results: total $P_2O_5$ 23.9%; water soluble $P_2O_5$ 13.5%; and citrate insoluble $P_2O_5$ 2.3%.

This sample was then extracted on a vacuum filter with 1 weight part of water to provide a filtrate analyzing 21.4% $P_2O_5$. The filtration was very rapid to produce a filter cake with 45% moisture. This filter cake was dried in a tumbler drier at 300° F. to produce small hard granules having the following analysis: total $P_2O_5$ 13.2%; citrate insoluble $P_2O_5$ 0.2%.

The total $P_2O_5$ in the phosphate rock was made available by this procedure, which also provided filtrate for recirculation and use on new mixtures of bark and rock with the sulfuric acid proportion as described. By this process, which uses fine bark particulate material in the initial stage, a constant volume of recycle filtrate is supplied from the extraction stage to substitute for part of the sulfuric acid required in treating the bark and phosphate rock combination in the initial stage, so that the end product will have available phosphate equal to the limit of the $P_2O_5$ in the rock used in the initial combination with the bark and a reduced level of calcium sulfate.

Referring to the flow sheet, the process is designed to be carried out on a continuous basis with the extraction and filtration step being carried out on a moving-belt type of suction filter, the amount of fresh water fed to the filter being determined, relative to the solids feed rate to the filter and the forward speed of the filter, to obtain the desired degree of extraction of phosphate from the solids. While the solid product produced from the drying of the filter cake is considered the main final product, the process can be carried out to also take off a portion of the filtrate as product phosphate solution, by carrying out the extraction further so that the available phosphate in the rock is distributed between the solid product and the liquid product.

As a further modification, the sulfuric acid may be added as part of the liquor used on the filter to obtain filtrate in the initial stage of the extraction procedure instead of being added to the bark and rock composition before this composition is dried.

Another modification comprises the use of bark solids, extracted as disclosed in said copending application Serial No. 803,130, in place of the raw bark starting material, and the use of the extracted water soluble acid solids as a part of the water used on the filter in the process shown in the flow sheet. In so doing, part of this extract acid will be removed in the filtrate and part will be resident in the filter cake and will be condensed during the drying of the cake.

*Example 3*

The bark phosphate products containing increased $P_2O_5$; fully retain the distinctive characteristics of the primary bark phosphate products.

Samples of the bark phosphate product previously made, which analyzed

|  | Percent |
|---|---|
| Total $P_2O_5$ | 23.9 |
| Water soluble $P_2O_5$ | 13.5 |
| Citrate insoluble $P_2O_5$ | 2.3 | were compared with ordinary superphosphate and reagent grade monocalcium phosphate monohydrate as reference materials in the following tests.

Samples of calcareous and acid soils were separately mixed with quantities of this bark phosphate product, and separately with quantities of ordinary superphosphate and separately with monocalcium phosphate monohydrate so as to provide equality in terms of P per 200 gm. of soil. The application rate was equivalent to 340 lbs. of $P_2O_5$ per 2,000,000 lbs. of soil. These materials were allowed to react with the soil in the pots for 18 days at 25° C. prior to placing oat plants in the soil.

At the end of a 7-day contact with the soil, soil samples were taken from one group of pots for determination of P. The oats were harvested from another group of pots and the tissue was ground and analyzed for determination of phosphorus in the tissue.

The results showed that the mean percent phosphorus in the tissue of oats from the soils containing bark phosphate product was 111% of that of the oats from soils containing monocalcium phosphate monohydrate and also 111% of the mean percent phosphorus in the tissue of oats from the soils containing ordinary superphosphate; but that the water soluble soil phosphorus in the soil where the bark phosphate product had been applied was only 68% of that in the soil where the monocalcium phosphate monohydrate had been applied and 67% of the water soluble soil phosphorus in the soil where the ordinary superphosphate had been applied.

The results show that while plant roots can obtain an increased rates of phosphorus uptake from this bark phosphate product, the bark phosphate product restricts the rate at which the phosphorus is diffused in soil solutions for loss or only partial utilization.

*Example 4*

Solutions containing $P_2O_5$ from sources outside the system can be used to extract the initial bark phosphate product, so as to increase the weight percent $P_2O_5$ in the filtrate and increase the weight of $P_2O_5$ of the final bark phosphate product recovered as filter cake. Such solutions include those produced as final filter stage acid from a wet process phosphoric acid production. As a specific example, a sample of the bark phosphate made previously, which analyzed total $P_2O_5$ 23.9%; water soluble $P_2O_5$ 13.5%; citrate insoluble $P_2O_5$ 2.3%, was extracted in a single extraction with 1.4 weight parts of phosphoric acid solution containing 32.6% $P_2O_5$ and 2.6% sulfuric acid. The bark phosphate product and acid solution were slurried for 1 minute and filtered rapidly under suction to leave a ½" cake. The cake was dried at 300° F. in a tumbler drier to produce granules which analyzed 36.8% total $P_2O_5$ and 1% citrate insoluble $P_2O_5$. The moisture evaporated as water during the drying of the cake was 32.5% of the weight of the wet filter cake. The filtrate solution analyzed 40% $P_2O_5$.

Thus, it will be understood by those skilled in the art that this modification of the basic process of the present invention provides a means for simultaneously concentrating relatively dilute phosphoric acid solutions and upgrading the bark phosphate products in respect to their available $P_2O_5$ contents.

In carrying out the process of the present invention where it is desired to obtain the special characteristics of the bark phosphate-product described, any tree bark may be used, including hemlock, pine, redwood, etc.

Having fully described my invention, it is to be understood that I do not wish to be limited to the details set forth but my invention is of the full scope of the appended claims.

I claim:

1. A process for producing a phosphate product having increased amounts of available phosphate thereon comprising, grinding together phosphate rock and moist bark to form a coating of rock particles upon the bark particles, said bark having a moisture content of 30% to 70% and being in the range of 20% to 800% of the weight of said phosphate rock on a dry basis, acidulating by uniformly distributing throughout the mixture of bark and rock 20% to 80% by weight of said rock of a solution of sulfuric acid and recycle liquor containing phosphate, drying the resulting mixture of bark, rock and acid at a temperature of from 100° F. to 1250° F. for from 3 to 30 minutes while agitating to cause the bark organic acids to undergo surface condensation and assist in binding the calcium in the phosphate rock to produce a product having a mineral acid, organic acid calcium, and water soluble phosphate coating thereon, extracting said product with an aqueous liquid selected from the group consisting of water and water containing phosphoric acid, to remove a portion of said phosphate therefrom, separating the resulting extract liquor containing phosphate and recirculating at least a portion og said extracted liquor to said acidulation step to concentrate the phosphate and recirculating at least a portion of said exphate content of the phosphate bark product.

2. The product produced by the process of claim 1.

3. The process of claim 1, wherein the mixture is ground during the acidulation step.

References Cited by the Examiner

UNITED STATES PATENTS

| 382,604 | 5/1888 | Goodale | 71—24 |
| 620,443 | 2/1899 | Goldsmith | 71—24 |
| 1,048,454 | 12/1912 | Bash | 71—24 |
| 1,668,464 | 5/1928 | Pease | 71—23 |
| 2,502,484 | 4/1950 | Saunders | 71—23 |
| 2,574,027 | 11/1951 | Farber | 71—24 |
| 2,881,066 | 4/1959 | Sproull et al. | 71—23 |
| 3,034,882 | 5/1962 | Renwick | 71—23 |

DONALL H. SYLVESTER, *Primary Examiner.*

ANTHONY SCIAMANNA, *Examiner.*